(12) United States Patent
Lee et al.

(10) Patent No.: US 9,075,431 B2
(45) Date of Patent: Jul. 7, 2015

(54) DISPLAY APPARATUS AND CONTROL METHOD THEREOF

(71) Applicant: SAMSUNG ELECTRONICS CO., LTD., Suwon-si (KR)

(72) Inventors: Dong-ho Lee, Seoul (KR); Hee-seob Ryu, Hwaseong-si (KR); Mikiyas Teshome, Suwon-si (KR); Ki-jun Jeong, Seoul (KR); Seung-kwon Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 164 days.

(21) Appl. No.: 13/692,654

(22) Filed: Dec. 3, 2012

(65) Prior Publication Data

US 2013/0147705 A1    Jun. 13, 2013

(30) Foreign Application Priority Data

Dec. 7, 2011    (KR) ........................ 10-2011-0130342

(51) Int. Cl.
| | |
|---|---|
| *G06F 21/32* | (2013.01) |
| *G06F 21/30* | (2013.01) |
| *G06F 3/01* | (2006.01) |
| *G06F 21/40* | (2013.01) |

(52) U.S. Cl.
CPC ........ *G06F 3/01* (2013.01); *G06F 21/32* (2013.01); *G06F 21/40* (2013.01)

(58) Field of Classification Search
None
See application file for complete search history.

(56) References Cited

U.S. PATENT DOCUMENTS

| | | | |
|---|---|---|---|
| 2009/0138805 A1* | 5/2009 | Hildreth | 715/745 |
| 2013/0144915 A1* | 6/2013 | Ravi et al. | 707/785 |

FOREIGN PATENT DOCUMENTS

KR    10-2010-0074580 A    7/2010

* cited by examiner

*Primary Examiner* — Robin Mishler
(74) *Attorney, Agent, or Firm* — Sughrue Mion, PLLC

(57) ABSTRACT

A display apparatus and control method are provided. The display apparatus includes a storage unit which is provided to store biometric information of an individual user and metadata corresponding to the biometric information; a biometric information input unit through which biometric information of a plurality of users is input; a display unit; and a controller which determines metadata corresponding to a first user by comparing the input biometric information of the first user with the stored biometric information, determines metadata corresponding to a second user by comparing the input biometric information of the second user with the stored biometric information, and generates information of a user group comprising the first and second users based on common metadata between the metadata of the first user and the metadata of the second user.

19 Claims, 5 Drawing Sheets

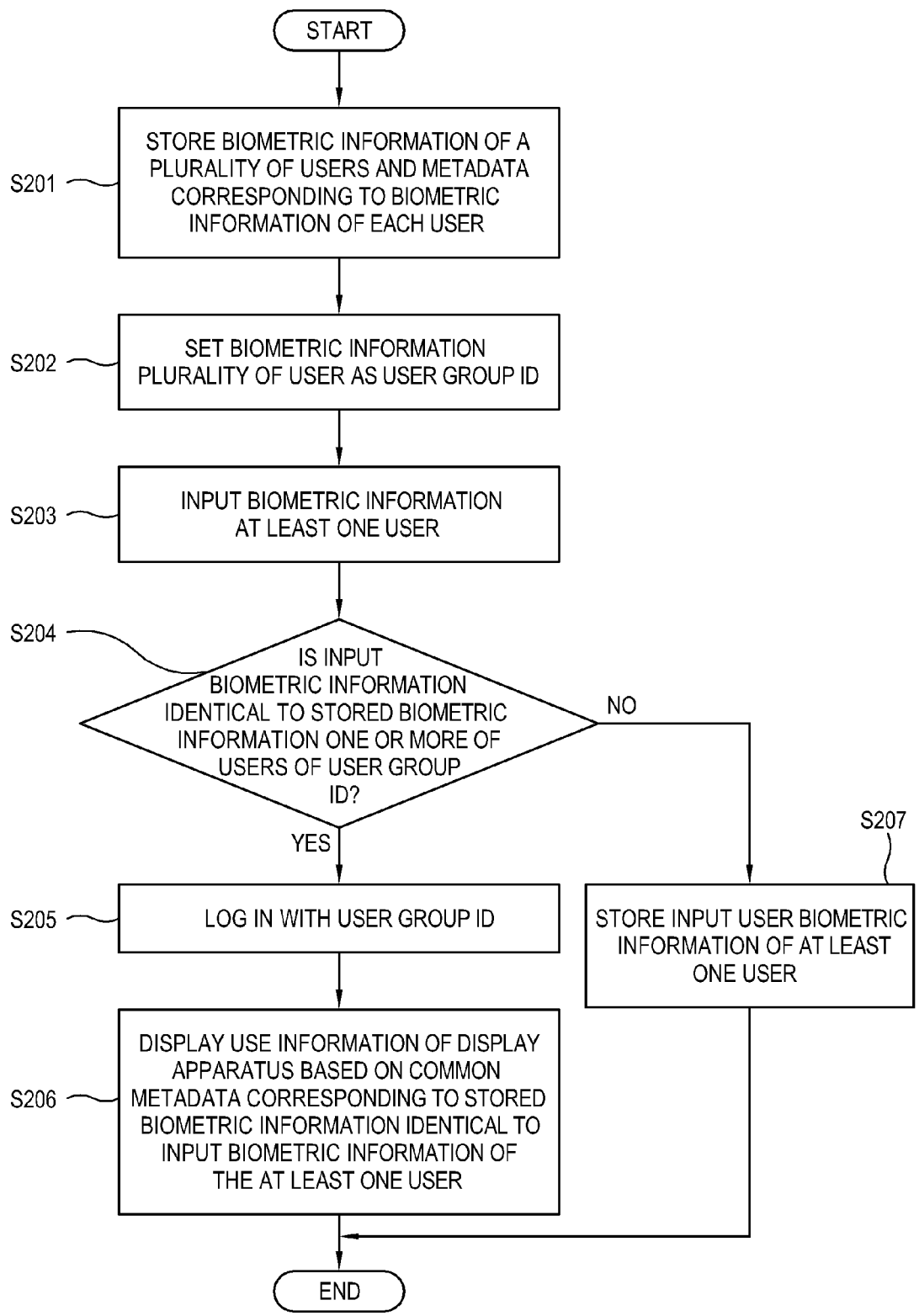

DISPLAY APPARATUS AND CONTROL METHOD THEREOF

CROSS-REFERENCE TO RELATED APPLICATION

This application claims priority from Korean Patent Application No. 10-2011-0130342, filed on Dec. 7, 2011 in the Korean Intellectual Property Office, the disclosure of which is herein incorporated by reference.

BACKGROUND

1. Field

Apparatuses and methods consistent with exemplary embodiments relate to a display apparatus and a control method thereof, and more particularly, to a display apparatus and a control method thereof which performs a user log-in operation.

2. Description of the Related Art

A related art electronic apparatus which is shared among a plurality of users is managed and used by assigning one account per user in terms of user account and log-in for user identification. If a plurality of users desires to use the electronic device together, they set and use a joint user account. To that end, the electronic device is set in the same environment, and the information for using the joint user account may be accessed by other users. Thus, if the electronic device is used by the joint user account, privacy of each user is not ensured. If each user sets his/her own account for protection of his/her privacy, the user suffers difficulty in logging into the electronic device by his/her user account every time.

SUMMARY

One or more exemplary embodiments provide a display apparatus and a control method thereof which protect privacy of a plurality of users even if the plurality of users sets a single group ID for use.

One or more exemplary embodiment also provide a display apparatus and a control method thereof which sets a user group ID with biometric information of a plurality of users and ensures automatic log-in operation by recognizing the biometric information of users in the future.

According to an aspect of an exemplary embodiment, there is provided a display apparatus comprising: a storage unit which is provided to store biometric information of an individual user and metadata corresponding to the biometric information; a biometric information input unit through which biometric information of a plurality of users is input; a display unit; and a controller which determines metadata corresponding to a first user by comparing the input biometric information of the first user with the stored biometric information, determines metadata corresponding to a second user by comparing the input biometric information of the second user with the stored biometric information, and generates information of a user group comprising the first and second users based on common metadata between the metadata of the first user and the metadata of the second user.

The information of the user group may include at least one of a user group ID, a visit and use history of the user group, environment setup information of the user group, and an address book of the user group.

The display apparatus may further include a user input unit, and a user interface (UI) generator which generates a menu button for setting a user group ID, wherein the controller sets the biometric information of the plurality of users as a single user group ID and stores the user group ID in the storage unit if the menu button is selected and the biometric information of the plurality of users is input through the biometric information input unit.

The controller may automatically perform a log-in with the user group ID if the display apparatus is turned on and the biometric information of at least one user of the plurality of users is identical to of the stored biometric information of one or more users belonging to the stored user group ID.

The biometric information input unit may receive the biometric information including at least one of a face, a fingerprint, an iris, a retina and a voice of a user.

The metadata may include at least one of environment setup data, an address book, a visit record and a viewing history of the display apparatus.

The display apparatus may further include a broadcasting signal receiver which receives a broadcasting signal and a signal processor which processes the received broadcasting signal.

The display apparatus may further include a communication unit which communicates with an external web server.

According to an aspect of another exemplary embodiment, there is provided a control method of a display apparatus, the control method comprising: storing biometric information of an individual user and metadata corresponding to the biometric information; inputting biometric information of a plurality of users; determining metadata corresponding to a first user by comparing the input biometric information of a first user with the stored biometric information, determining metadata corresponding to a second user by comparing the input biometric information of the second user with the stored biometric information; and generating information of a user group comprising the first and second users based on common metadata between the determined metadata of the first and second users.

The information of the user group may include at least one of a user group ID, a visit and use history of the user group, environment setup information of the user group, and an address book of the user group.

The control method may further include generating a menu button for setting a user group ID; and setting and storing the input biometric information of the plurality of users as a single user group ID if the menu button is selected and the biometric information of the plurality of users is input.

The control method may further include automatically logging in the display apparatus with the user group ID if the display apparatus is turned on and input biometric information of at least one user of the plurality of users is identical to the stored biometric information of one or more users belonging to the stored user group ID.

The biometric information input unit may receive the biometric information including at least one of a face, a fingerprint, an iris, a retina and a voice of a user.

The metadata may include at least one of environment setup data, an address book, a visit record and a viewing history of the display apparatus.

The control method may further include receiving a broadcasting signal; and processing the received broadcasting signal.

The control method may further include communicating with an external web server.

According to an aspect of another exemplary embodiment, there is provided a record medium which records a program to be executed by a computer according to one of the foregoing methods.

BRIEF DESCRIPTION OF THE DRAWINGS

The above and/or other aspects will become apparent and more readily appreciated from the following description of exemplary embodiments, taken in conjunction with the accompanying drawings, in which:

FIG. 5 is a control flowchart of the display apparatus in FIG. 1.

DETAILED DESCRIPTION

Figure 1:
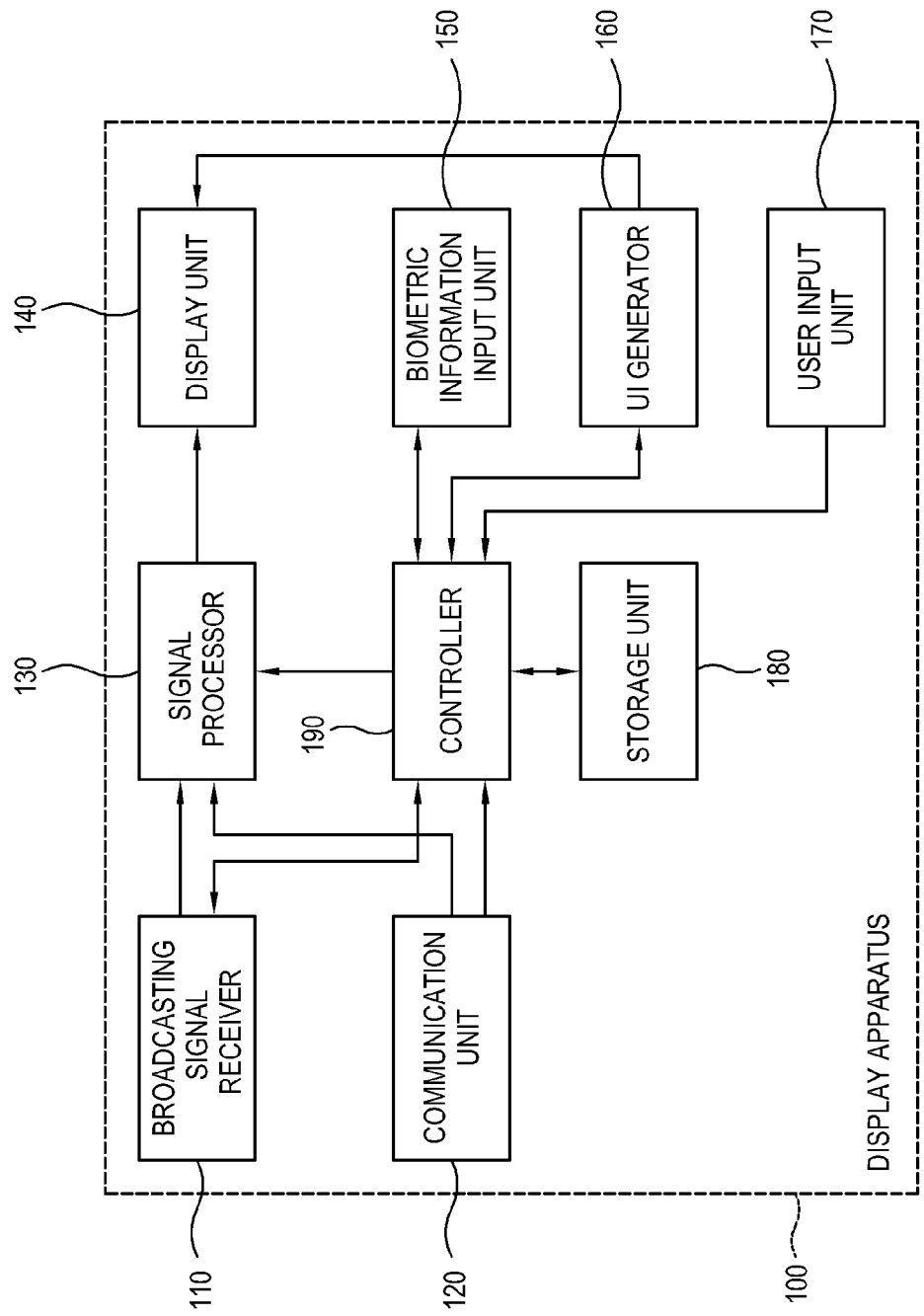
FIG. 1 is a control block diagram of a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a control block diagram of a display apparatus according to an exemplary embodiment.

A display apparatus 100 includes a broadcasting signal receiver 110, a communication unit 120, a signal processor 130, a display unit 140, a biometric information input unit 150, a user interface (UI) generator 160, a user input unit 170, a storage unit 180 and a controller 190.

The display apparatus 100 may include any display apparatus which receives in real time a broadcasting signal from an external broadcasting signal transmission device (not shown) and communicates with an external device (not shown) such as a web server through a network. The display apparatus 100 according to the present exemplary embodiment includes a smart television (TV), but is not limited thereto. A smart TV may receive and display a broadcasting signal in real time. The smart TV includes a web browser function so that the smart TV may display a broadcasting signal in real time and may enable a user to search and consume various contents on the Internet, providing a convenient user environment. The smart TV includes an open software platform and may provide a user with interactive services. Accordingly, the smart TV may provide various contents through an open software platform, e.g., an application may provide various types of services, e.g., SNS, finance, news, weather, map, music, movie, game, e-book, etc.

Such smart TV may be used by a plurality of users, and may set a user account for each user. Each user may log in the smart TV with his/her set user account and use the smart TV. After logging in the smart TV, a user may set a display status of the smart TV differently from a user of another user account. The smart TV may store various information, such as, for example, a viewing history of a broadcasting program, a visit record of a web page, an address book, etc. as metadata for each user account.

The broadcasting signal receiver 110 receives a broadcasting signal from an external broadcasting signal transmission device (not shown), and includes a tuner. For example, the broadcasting signal receiver 110 receives an analog or digital broadcasting signal from a broadcasting station, in a wireless/wired manner, i.e., by airwave or cable. The broadcasting signal receiver 110 may vary depending on broadcasting signal standards and the type of the display apparatus 100. If the broadcasting signal receiver 110 receives an analog broadcasting signal, the broadcasting signal receiver 110 may receive a broadcasting signal realized as a radio frequency (RF) signal by airwave in a wireless manner, or receive a broadcasting signal realized as a composite/component video signal by cable in a wired manner. The broadcasting signal receiver 110 may receive a digital broadcasting signal in accordance with high definition multimedia interface (HDMI) standards.

The communication unit 120 may communicate with an external server (not shown). The external server may include a web server, and the display apparatus 100 may display a web page transmitted by the web server through a web browser. Otherwise, the external server provides a plurality of applications providing a service, and the display apparatus 100 may download an application program as selected by a user, from the external server through the communication unit 120. The communication unit 120 may communicate with the external server through known wired/wireless network, e.g., local area network (LAN) or wireless local area network (WLAN). Otherwise, the communication unit 120 may communicate with an external electronic device (not shown) that includes content and is located in a network. For example, the display apparatus 100 may form a digital living network alliance (DLNA) with the external electronic device located in a space, and receive content from the external electronic device in the DLNA and display the content therein.

The signal processor 130 processes a broadcasting signal received by the broadcasting signal receiver 110, and displays the broadcasting signal on the display unit 140. The signal processor 130 processes various contents received through the communication unit 120 other than the broadcasting signal, and displays the contents on the display unit 140. The image processing operation performed by the signal processor 130 may include one or more of analog/digital conversion (ADC), demodulating, decoding and de-interlacing operations, conversion of frame refresh rate, scaling, detail enhancement, depending on an image signal to be processed.

The signal processor 130 may include individual components to perform the aforementioned image processing operations individually, or include a system-on chip (SoC) which integrates the functions.

The display unit 140 displays an image thereon based on a broadcasting signal output by the signal processor 130. The display unit 140 may include, without limitation, liquid crystal, plasma, light emitting diode, organic light emitting diode, surface-conduction electron-emitter, carbon nano-tube, and nano-crystal.

The biometric information input unit 150 receives biometric information of a plurality of users. The biometric information may include one or more of a user's face, fingerprint, iris, retina, voice and the shape of a hand, or other similar biometric data.

If biometric information includes a user's face recognition information, the biometric information input unit 150 may include a face recognition sensor or a camera to acquire an image or a video to recognize at least one user's face. The image or video including the at least one user's face acquired by the sensor or camera is transmitted to the controller 190. Then, the controller 190 may analyze the image or video acquired by the sensor or camera by using a known face recognition algorithm, generate the number of users and a user's face recognition information included in the image/video, and store the number of users and a user's face recognition information in the storage unit 180 (to be described later). The face recognition process which is performed by the controller 190 may include a face detection process and a face feature extraction process. The face detection process is performed to detect a face area from the image/video acquired by the sensor/camera. For accurate face recognition, a face normalization process is performed and a normal face area and an eye position are detected for the face normalization process. The face normalization process is efficient in normalizing the size and rotation of a face image based on two eyes. After the face detection process, user recognition is performed through the face feature extraction process. The face feature extraction process extracts an inherent value for each user from the input face image after a pretreatment is performed such as reducing a change in a pixel value or removing noise from the face image due to a change in lighting.

Through the process as above, the controller 190 may determine the number of users by detecting the user's face from the image and/or video input by the sensor or camera, and generate user face recognition information to recognize each user through the face feature extraction process from the detected face.

If the biometric information includes a user's fingerprint recognition information, the biometric information input unit 150 may include a fingerprint recognition sensor. The fingerprint recognition sensor generates fingerprint data corresponding to the shape of the fingerprint on a surface of the sensor depending on an amount of current. The amount of current varies according to the finger contacting the sensor. The controller 190 may perform user identification by analyzing the fingerprint data transmitted by the fingerprint recognition sensor by using a known fingerprint recognition algorithm, and store the fingerprint data as user recognition information in the storage unit 180.

If the biometric information includes a user's iris recognition information, the biometric information input unit 150 may include an iris recognition sensor or a camera which captures the iris. Iris recognition denotes recognition of a pattern of the iris surrounding the pupil. Each person has his/her own pattern of the iris and such a pattern may be used for recognizing a user. The iris pattern includes the shape and color of the iris, and the shape of capillary vessel of the retina. The iris image acquired by the sensor/camera is transmitted to the controller 190. The controller 190 may recognize a user by determining the iris pattern from the image by using a known iris recognition algorithm, and store the iris pattern as the user recognition information in the storage unit 180.

If the biometric information includes a user's retina recognition information, the biometric information input unit 150 may include a retina recognition sensor or a camera capturing the retina. Retina recognition denotes recognition of a composition of capillary vessels located in the rear surface of the eyeball. Each person has a different composition of capillary vessels. Thus, such a retina pattern may be used to recognize a user. The retina image acquired by the sensor/camera is transmitted to the controller 190. The controller 190 may recognize a user by determining a retina pattern from the image by using a known retina recognition algorithm, and store the retina pattern as the user's biometric information in the storage unit 180.

If the biometric information includes a user's voice recognition information, the biometric information input unit 150 may include a microphone to input a user's voice. The voice recognition uses pitch information according to a user's accent and speaking habit as such information is different by user. The pitch information for a user's voice may be used to recognize a user. Voice data which are acquired from the microphone are transmitted to the controller 190. The controller 190 may recognize the user's pitch information from the voice data by using a known voice recognition algorithm and store the pitch information as the user's biometric information in the storage unit 180.

The biometric information may further include hand shape recognition information, palm print recognition information and recognition information of the veins in the back of user's hand. The biometric information input unit 150 may include a camera which captures the shape of hand, palm print or vein image. In other words, any other biometric data which is capable of distinguishing a user is contemplated.

The UI generator 160 generates a first menu button to set a user group ID. If a particular key is input through the user input unit 170 (to be described later), the controller 190 controls the UI generator 160 to generate, and display on the display unit 140, the first menu button for setting the user group ID.

The UI generator 160 may generate, and display on the display unit 140, a second menu button to set an individual user ID by a control of the controller 190.

The UI generator 160 may generate, and display on the display unit 140, a third menu button for a user to select whether to log in with the user group ID or with the individual user ID by a control of the controller 190 if the display apparatus 100 is turned on and the particular key is input through the user input unit 170.

The user input unit 170 is manipulated by a user, and generates and transmits to the display apparatus 100 a command relating to various control operations of the display apparatus 100. The command may be preset. The user input unit 170 may vary, as long as the user input unit 170 allows manipulation by a user. The user input unit 170 may be provided as a button in one side of the display apparatus 100, as a touch panel or a remote controller which is installed remotely from the display apparatus 100 and communicates with the display apparatus 100, or a smart phone which includes an application functioning as a remote controller.

The storage unit 180 stores therein the user's biometric information and metadata corresponding to the biometric information.

The display apparatus 100 according to the present exemplary embodiment may include a smart TV as described above. A plurality of users which use the display apparatus 100 may individually set his/her own user identification (ID), or may set a group ID available for all of the plurality of users. If at least one of the plurality of users desires to set an individual user ID and inputs a particular key of the user input unit 170, the controller 190 analyzes the biometric information input through the biometric information input unit 150 and stores the biometric information as the user's biometric information in the storage unit 180. If a user logs in the display apparatus 100 with the individual user ID through the third menu button, the controller 190 may store in the storage unit 180 various environment setup data of the display apparatus 100, such as, for example, a viewing history of a broadcasting program, a visit record of a web page or an address book as metadata corresponding to the individual user ID. The environment setup data include data regarding brightness, contrast, darkness and picture ratio of the display unit. The address book is stored for calls which are made through a call application, and may include telephone numbers and/or email-addresses. Accordingly, the storage unit 180 may store therein biometric information for the plurality of users and metadata corresponding to the biometric information.

The controller 190 compares each biometric information input through the biometric information input unit 150 with the biometric information stored in the storage unit 180, determines whether the input biometric information matches the stored biometric information, and if so, determines the metadata corresponding to the stored biometric information that is identical to the input biometric information and generates information of a user group based on common metadata among the metadata. The information of the user group includes at least one of user group ID, a visit and use history in the user group, an environment setup information of the user group, and an address book of the user group. The information of the user group includes information on the use of the display apparatus 100 by the plurality of users, and is determined by the metadata stored for each user in the storage unit 180. Hereinafter, the control operation of the controller 190 will be descried in more detail with reference to FIGS. 2 to 4.

Figure 2:
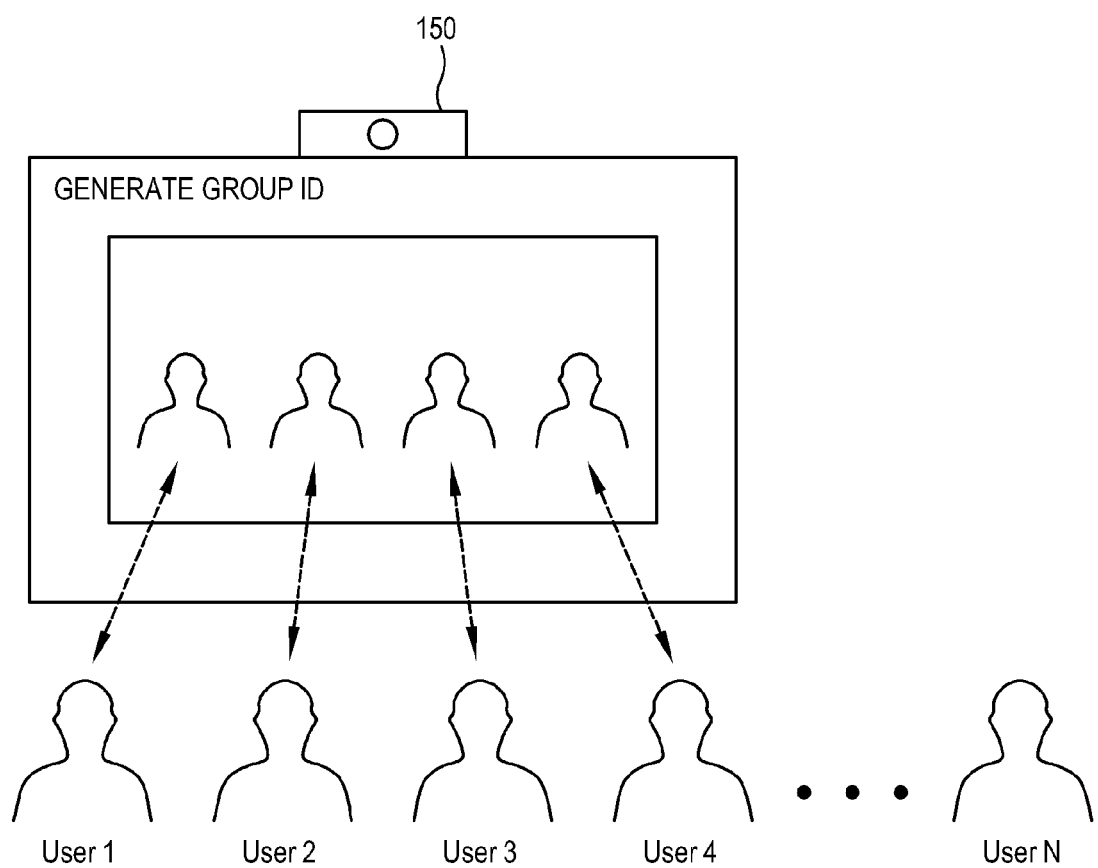
FIG. 2 illustrates an example of setting a user group ID for a plurality of users in the display apparatus in FIG. 1.

FIG. 2 illustrates an example of setting a user group ID for a plurality of users by the display apparatus 100 of FIG. 1.

If the display apparatus 100 is turned on or a particular key is input through the user input unit 170 while a broadcasting program received through the broadcasting signal receiver 110 is displayed, the controller 190 controls the UI generator 160 to generate and display on the display unit 140 the first menu button for setting the user group ID. If the first menu button is selected, the biometric information input unit 150 captures an image and/or video of a plurality of users (users 1 to N) positioned in front of the display apparatus 100 and transmits the image and/or video to the controller 190. (Note that FIG. 2 shows an example in which User1 to User 4 are captured). The biometric information input unit 150 according to the present exemplary embodiment inputs the face recognition information of the users as the biometric information, but the biometric information is not limited to the face recognition information as described above.

The controller 190 analyzes the image and/or video transmitted by the biometric information input unit 150 by using a known face recognition algorithm and generates information on the number of users and the face recognition information of each user. The controller 190 sets a single user group ID for the plurality of users' face recognition information generated according to the analysis results, and stores the user group ID in the storage unit 180.

Figure 3:
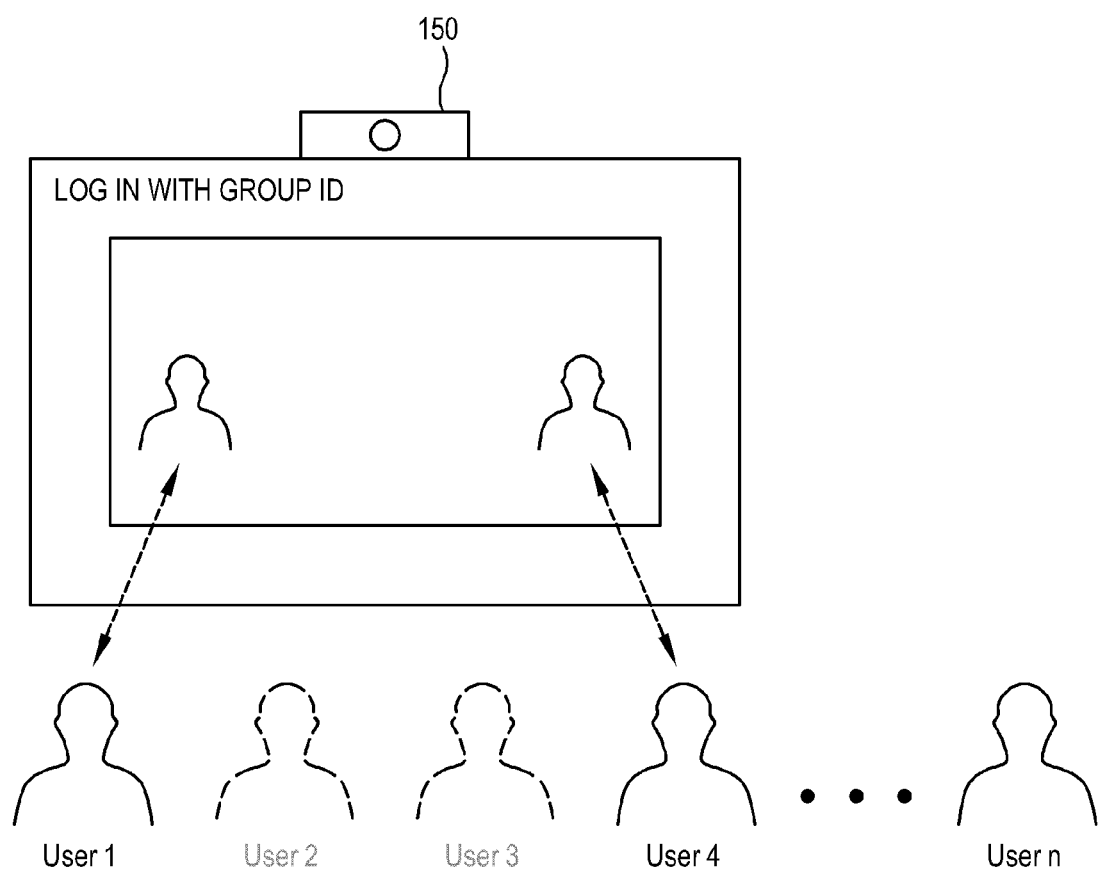
FIG. 3 illustrates an example of automatic log-in by a plurality of users to the display apparatus in FIG. 1 by using the user group ID.

FIG. 3 illustrates an example of an automatic log-in with the user group ID by the plurality of users to the display apparatus 100 of FIG. 1. FIG. 3 illustrates an example of an automatic log-in with the user group ID after the plurality of users (users 1 to N) is set as the single user group ID as shown in the example of FIG. 2.

If the display apparatus 100 is turned on or a particular key is input through the user input unit 170 while a broadcasting program received through the broadcasting signal receiver 110 is displayed, the controller 190 controls the biometric information input unit 150 to capture an image and/or video of at least one user present in front of the display apparatus 100. The controller 190 analyzes the image and/or video transmitted by the biometric information input unit 150 by using a known face recognition algorithm and generates information on the number of users and the face recognition information of each user. If users who are present in front of the display apparatus 100 are User1 and User4, the controller 190 analyzes the biometric information of User1 and User4 from the image and/or video transmitted by the biometric information input unit 150, and compares the biometric information with the plurality of users' biometric information stored in the storage unit 180. If the users are recognized as the User1 and User4 belonging to the user group ID, the display apparatus 100 is automatically logged in with the group ID. Users may automatically log in the display apparatus 100 by using the biometric information without inputting the ID and password through the user input unit 170, and this enhances convenience.

If biometric information of a user which is present in front of the display apparatus 100 and which is not stored in the storage unit 180 among the plurality of users that were registered for the group ID is recognized, the controller 190 may store the user's biometric information in the storage unit 180.

Figure 4:
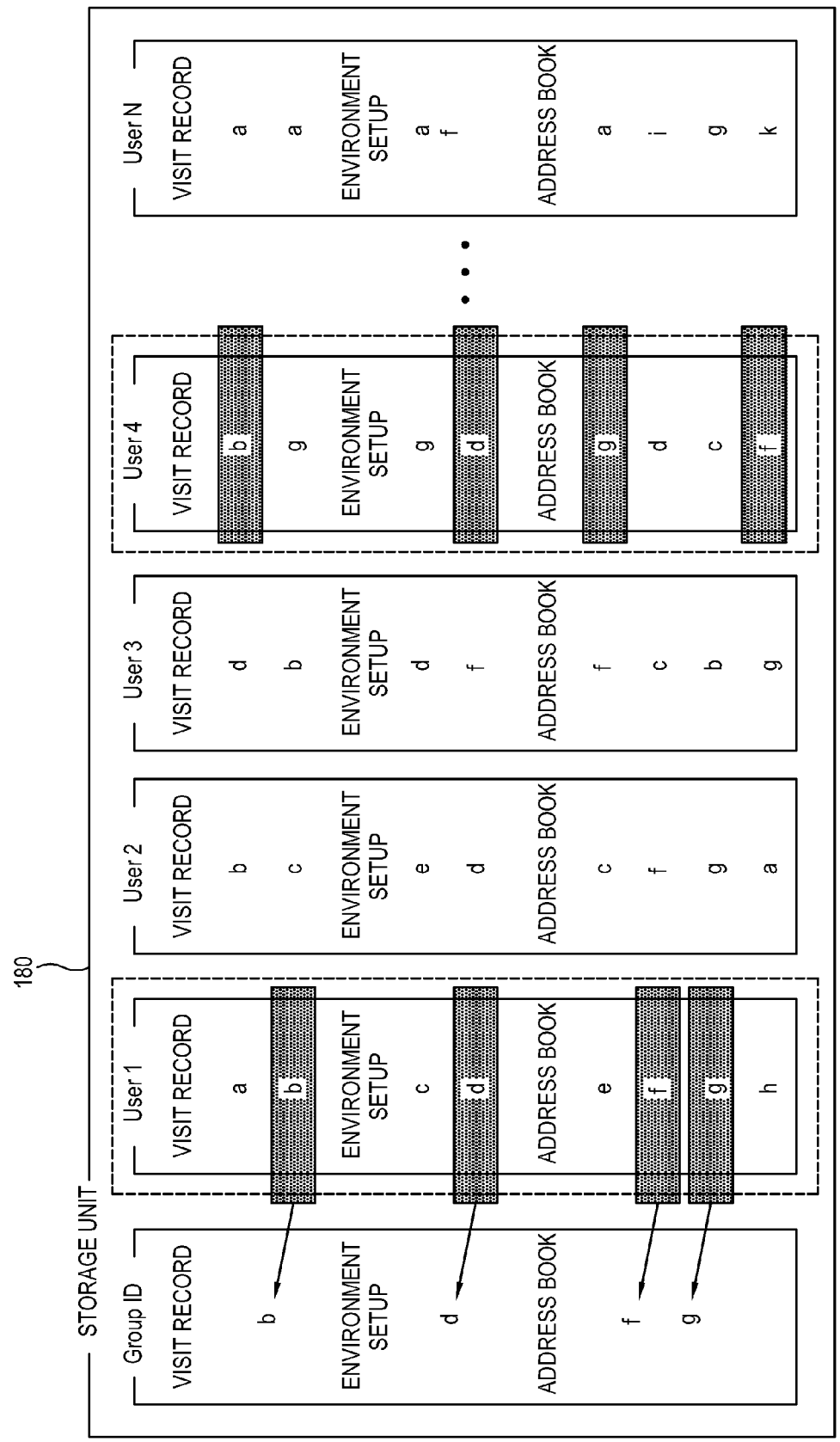
FIG. 4 illustrates an example of a storage unit of the display apparatus in FIG. 1.

FIG. 4 illustrates an example of the storage unit of the display apparatus 100 of FIG. 1.

The display apparatus 100 may set not only the group ID but also an individual ID by using the biometric information. If a particular key is input through the user input unit 170, the controller 190 controls the UI generator 160 to generate and display on the display unit 140 the third menu button. If the third menu button is selected, the controller 190 controls the biometric information input unit 150 to capture the image and/or video of an individual user. If an individual user ID is set while a plurality of users is present in front of the display apparatus 100, the controller 190 displays on the display unit 140 the image and/or video captured by the biometric information input unit 150, and controls the UI generator 160 to generate and display a fourth menu button to select a user for which the individual ID is set, from the displayed image and/or video.

The controller 190 generates the face recognition information of the user selected from the image and/or video by using the known face recognition algorithm and sets the face recognition information as the individual ID in the storage unit 180. Accordingly, a user who has the individual ID set may log in with the individual ID and use the display apparatus 100. Metadata for each individual ID may also be stored in the storage unit 180. The metadata include, for example, environment setup data of the display apparatus 100, a viewing history of a broadcasting program, a visit record of a web page, or an address book, etc., after the display apparatus 100 is logged in by the individual user ID. Accordingly, metadata corresponding to the biometric information of an individual user of a plurality of users are stored in the storage unit 180. FIG. 4 illustrates metadata stored for a plurality of users 1 to N.

If User1 and User4 log in the display apparatus 100 with the group ID including User1 to UserN as shown in FIG. 3, the controller 190 may extract a common part of the metadata of User1 and User4. Referring to FIG. 4, if the visit record of User1 is a and b, and the visit record of User4 is b and g, the controller 190 may display on the display unit 140 only b as the common visit record of User1 and User4.

If the environment setup data of the display apparatus 100 of User1 is set as c and d, and a User4 is set as g and d, the controller 190 sets the environment setup data of the display apparatus 100 as d which is the common part of User1 and User4, and controls the display status of the display unit 140.

If an address book of User1 is stored as e, f, g and h, and an address book of User4 is stored as g, d, c and f, the controller 190 displays only f and g as the common part of User1 and User4 on the display unit 140. Then, even if a plurality of users log in with the group ID and use the display apparatus 100, the display apparatus 100 displays only the common metadata and protects the privacy of each user.

FIG. 5 is a control flowchart of the display apparatus 100 in FIG. 1.

As shown in FIG. 5, the biometric information of a plurality of users and the metadata corresponding to the biometric information of each user are stored in the storage unit 180 (S201). If the plurality of users' biometric information is input through the biometric information input unit 150, the plurality of users' biometric information is set as the user group ID (S202). If a particular key is input through the user input unit 170, the controller 190 controls the UI generator 160 to generate and display a menu button to set the user group ID. Upon selecting the menu button, the plurality of users' biometric information input through the biometric information input unit 150 is set as the user group ID.

If the display apparatus 100 is turned on or a particular key is input through the user input unit 170 while a broadcasting program received through the broadcasting signal receiver 110 is displayed, the controller 190 controls the biometric information input unit 150 to receive biometric information of at least one user present in front of the display apparatus 100 (S203). The controller 190 analyzes the input biometric information and determines whether the input biometric information is identical to biometric information of one or more of the plurality of users of the user group ID stored in the storage unit 180 (S204). If the input biometric information is identical to the stored biometric information of one or more of the plurality of users belonging to the user group ID, the controller 190 performs an automatic log-in with the user group ID (S205). Based on the common metadata among the metadata corresponding to the stored biometric information identical to the input biometric information of the at least one user, the use information of the display apparatus 100 is displayed (S206).

At operation S204, if the input biometric information of the at least one user is not identical to the stored biometric information as analyzed by the controller 190, the user's biometric information is stored in the storage unit 180 (S207).

A control method of the display apparatus 100 may be realized as a program command executed by a central processing unit (CPU) and may be stored in a storage medium read by a computer. The computer readable storage medium may include solely or collectively a program command, data file, and data structure. The program command which is recorded in the storage medium may be designed or configured specifically for implementing the present inventive concept or may be a program command known to those skilled in computer software and available. For example, the computer-readable record medium may include a hard disk, a floppy disk, magnetic media such as a magnetic tape, optical medium such as CD-ROM and DVD, magneto-optical media such as floptical disk, or a hardware device which is specifically configured to store and execute a program command such as ROM, RAM, and flash memory. The program command includes not only a mechanical language code created by a compiler but also an advanced language code executed by a computer by using an interpreter. The hardware device may be configured to operate as at least one software module for performing the operation according to the present inventive concept, and vice versa. Further, the term "unit" as used herein means a hardware component, such as a processor or circuit, and/or a software component that is executed by a hardware component such as a processor.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus comprising:
a storage unit which is provided to store biometric information of an individual user and metadata corresponding to the biometric information;
a biometric information input unit through which biometric information of a plurality of users is input;
a display unit;
a user input unit configured to receive a user input;
a controller which determines metadata corresponding to a first user by comparing the input biometric information of the first user with the stored biometric information, determines metadata corresponding to a second user by comparing the input biometric information of the second user with the stored biometric information, and generates information of a user group comprising the first and second users based on common metadata between the metadata of the first user and the metadata of the second user; and
a user interface (UI) generator which is controlled by the controller to generate and display on the display unit a first menu button for a user to select whether to log in with a user group identification (ID) or with an individual user ID via the user input unit, and in response to the individual user ID being selected when the plurality of users are present, to generate and display on the display unit a second menu button for the user to select, via the user input unit, one of the plurality of users to log in with the individual user ID.

2. The display apparatus according to claim 1, wherein the information of the user group comprises at least one of the user group ID, a visit and use history of the user group, environment setup information of the user group, and an address book of the user group.

3. The display apparatus according to claim 1,
wherein the user interface (UI) generator generates and displays on the display unit a third menu button for setting the user group ID,
wherein the controller sets the input biometric information of the plurality of users as a single user group identification (ID) and stores the single user group ID in the storage unit if the third menu button is selected via the user input and the biometric information of the plurality of users is input through the biometric information input unit.

4. The display apparatus according to claim 1, wherein the biometric information comprises at least one of a face, a fingerprint, an iris, a retina and a voice of a user.

5. The display apparatus according to claim 1, wherein the metadata comprises at least one of environment setup data, an address book, a visit record and a viewing history of the display apparatus.

6. The display apparatus according to claim 1, further comprising:
a broadcasting signal receiver which receives a broadcasting signal; and
a signal processor which processes the received broadcasting signal.

7. The display apparatus according to claim 6, further comprising a communication unit which communicates with an external web server.

8. A control method of a display apparatus, the control method comprising:
storing biometric information of an individual user and metadata corresponding to the biometric information;
inputting biometric information of a plurality of users;
determining metadata corresponding to a first user by comparing the input biometric information of the first user with the stored biometric information, determining metadata corresponding to a second user by comparing the input biometric information of the second user with the stored biometric information;

generating information of a user group comprising the first and second users based on common metadata between the determined metadata of the first and second users;

generating and displaying a first menu button for a user to select whether to log in with a user group identification (ID) or with an individual user ID; and in response to the individual user ID being selected when the plurality of users are present, generating and displaying a second menu button for the user to select one of the plurality of users to log in with the individual user ID.

9. The control method according to claim 8, wherein the information of the user group comprises at least one of the user group ID, a visit and use history of the user group, environment setup information of the user group, and an address book of the user group.

10. The control method according to claim 8, further comprising generating and displaying a third menu button for setting the user group ID; and setting and storing the input biometric information of the plurality of users as a single user group identification (ID) if the third menu button is selected and the biometric information of the plurality of users is input.

11. The control method according to claim 8, wherein the biometric information comprises at least one of a face, a fingerprint, an iris, a retina and a voice of a user.

12. The control method according to claim 8, wherein the metadata comprises at least one of environment setup data, an address book, a visit record and a viewing history of the display apparatus.

13. The control method according to claim 8, further comprising:

receiving a broadcasting signal; and processing the received broadcasting signal.

14. The control method according to claim 13, further comprising communicating with an external web server.

15. A non-transitory computer-readable recording medium storing a program to be executed by a computer, the program when executed performing a control method comprising:

storing biometric information of an individual user and metadata corresponding to the biometric information;

inputting biometric information of a plurality of users;

determining metadata corresponding to a first user by comparing the input biometric information of the first user with the stored biometric information, determining metadata corresponding to a second user by comparing the input biometric information of the second user with the stored biometric information, and generating information of a user group comprising the first and second users based on common metadata between the determined metadata of the first and second users;

generating and displaying a first menu button for a user to select whether to log in with a user group identification (ID) or with an individual user ID; and in response to the individual user ID being selected when the plurality of users are present, generating and displaying a second menu button for the user to select one of the plurality of users to log in with the individual user ID.

16. The display apparatus according to claim 1, wherein the biometric information input unit comprises one or more of a camera, a face recognition sensor, a fingerprint recognition sensor, an iris recognition sensor, a retina recognition sensor, or a microphone.

17. The display apparatus according to claim 1, wherein the controller automatically performs a login with the user group ID when the plurality of users is present.

18. The control method according to claim 8, further comprising automatically performing a login with the user group ID when the plurality of users is present.

19. The control method according to claim 15, further comprising automatically performing a login with the single user group ID when the plurality of users is present.

* * * * *